United States Patent [19]

Breed et al.

[11] Patent Number: 6,081,757
[45] Date of Patent: Jun. 27, 2000

[54] SEATED-STATE DETECTING APPARATUS

[75] Inventors: David S. Breed, Boonton Township, Morris County, N.J.; Wilbur E. DuVall, Kimberling City, Mo.; Jeffrey L. Morin, Grosse Ile, Mich.

[73] Assignee: Automotive Technologies International, Inc., Denville, N.J.

[21] Appl. No.: 08/970,822

[22] Filed: Nov. 14, 1997

Related U.S. Application Data

[63] Continuation-in-part of application No. 08/474,783, Jun. 7, 1995, Pat. No. 5,822,707.

[51] Int. Cl.[7] .................................................. B60R 21/22
[52] U.S. Cl. ............................ 701/45; 280/735; 180/273
[58] Field of Search ................................ 701/45, 46, 47, 701/49; 318/286, 466, 467, 468; 280/728.1, 734, 735; 180/271, 273, 268; 307/10.1

[56] References Cited

U.S. PATENT DOCUMENTS

| 5,232,243 | 8/1993 | Blackburn et al. | 280/735 |
|---|---|---|---|
| 5,377,108 | 12/1994 | Nishio | 701/45 |
| 5,573,269 | 11/1996 | Gentry et al. | 280/734 |
| 5,583,771 | 12/1996 | Lynch et al. | 701/45 |
| 5,670,853 | 9/1997 | Bauer | 180/273 |
| 5,702,123 | 12/1997 | Takahashi et al. | 280/735 |
| 5,785,347 | 7/1998 | Adolph et al. | 280/735 |
| 5,822,707 | 10/1998 | Breed et al. | 701/49 |

*Primary Examiner*—Gary Chin
*Attorney, Agent, or Firm*—Brian Roffe

[57] ABSTRACT

A seated-state detecting unit for determining the occupancy of a seat in a passenger compartment of a vehicle including wave transmitting sensors such as ultrasonic sensors for transmitting waves into the passenger compartment toward the seat and receiving reflected waves from the passenger compartment and specifically from the seat and its contents, a weight sensor for detecting weight applied onto the seat, and an evaluation circuit to which outputs of the wave sensors and the weight sensors are input and which evaluates a seated-state, based on the outputs from the wave sensors and weight sensor.

22 Claims, 7 Drawing Sheets

SEATED-STATE DETECTING APPARATUS

CROSS-REFERENCE TO RELATED APPLICATION

This application is a continuation-in-part of U.S. patent application Ser. No. 08/474,783 filed Jun. 7, 1995, now U.S. Pat. No. 5,822,707.

FIELD OF THE INVENTION

The present invention relates to a seated-state detecting apparatus that evaluates the seated state of an occupant in a compartment with a plurality of sensors such as ultrasonic sensors, and affects the operation of another system in the vehicle in response to the detected seated-state and more particularly to a seated-state detecting apparatus suitable for use in a deployable occupant protection apparatus such as airbag systems.

BACKGROUND OF THE INVENTION

Automobiles equipped with airbags are well known in the prior art. In such airbag systems, the car crash is sensed and the airbags rapidly inflated thereby ensuring the safety of an occupation in a car crash. Many lives have now been saved by such airbag systems.

However, depending on the seated state of an occupant, there are cases where his or her life cannot be saved even by present airbag systems. For example, when a passenger is seated on the front passenger seat in a position other than a forward facing, normal state, e.g., when the passenger is out of position and near the deployment door of the airbag, there will be cases when the occupant will be seriously injured or even killed by the deployment of the airbag.

Also, sometimes a child seat is placed on the passenger seat in a rear facing position and there are cases where a child sitting in such a seat has been seriously injured or killed.

Furthermore, in the case of a vacant seat, there is no need to deploy an airbag, and in such a case, deploying the airbag is undesirable due to a high replacement cost and possible release of toxic gases into the passenger compartment. Nevertheless, most airbag systems will deploy the airbag in a vehicle crash even if the seat is unoccupied.

For these reasons, there has been proposed a seated-state detecting unit such as disclosed in the following U.S. Patents and Patent applications, which are included herein by reference, assigned to the current assignee of the present application: Breed et al (U.S. Pat. No. 5,563,462); Breed et al (U.S. patent application Ser. No. 08/640,068 filed Apr. 30, 1996); Breed et al (U.S. patent application Ser. No. 08/474, 783 filed Jun. 7, 1995): Breed et al (U.S. Patent application Ser. No. 08/476,882 filed Jun. 7, 1995; Breed et al (U.S. patent application Ser, No. 08/474,784 filed Jun. 7, 1995; and Varga et al (U.S. patent application Ser. No. 08/798,029 filed Feb. 6, 1997). Typically, in some of these designs four sets of ultrasonic sensors are installed at four points in a vehicle passenger compartment for transmitting ultrasonic or electromagnetic waves toward the passenger or driver's seat and receiving the reflected waves. Using appropriate hardware and software, the approximate configuration of the occupancy of either the passenger or driver seat can be determined thereby identifying and categorizing the occupancy of the relevant seat.

However, in the aforementioned prior art using ultrasonics, the pattern of reflected ultrasonic waves from an adult occupant who may be out of position is sometimes similar to the pattern of reflected waves from a rear facing child seat. Also, it is sometimes difficult to discriminate the wave pattern of a normally seated child with the seat in a rearward position from an empty seat with the seat in a more forward position. In other cases, the reflected wave pattern from a thin slouching adult can be similar to that from a rear facing child seat. In still other cases, the reflected pattern from a passenger seat which is in a forward position can be similar to the reflected wave pattern from a seat containing a forward facing child seat or a child sitting on the passenger seat. In each of these cases, the prior art ultrasonic systems can suppress the deployment of an airbag when deployment is not desired or, alternately, can enable deployment when deployment is desired.

If the discrimination between these cases can be improved, then the reliability of the seated-state detecting unit can be improved and more people saved from death or serious injury. In addition, the unnecessary deployment of an airbag can be prevented.

OBJECTS OF THE INVENTION

Accordingly, it is a principal object of the present invention to provide a seated-state detecting unit that evaluates the seated-state of a passenger or driver seat by a combination of ultrasonic sensors and additional sensors.

Another object of the present invention is to provide a seated-state detecting unit which is capable of reliably performing discrimination between a normally seated passenger and a forward facing child seat, discrimination between an abnormally seated passenger and a rear facing child seat, and discrimination of whether or not the seat is empty.

Further objects of the present invention will become apparent from the following discussion of the preferred embodiments of the invention.

SUMMARY OF THE INVENTION

A seated-state detecting unit according to the present invention comprises: a plurality of ultrasonic sensors for transmitting ultrasonic waves toward a seat and the receiving reflected waves from the seat and its contents, if any; one or more weight sensors for detecting weight of an occupant in the seat or an absence of weight applied onto the seat indicative of a vacant seat; and processor means or an evaluation circuit to which output of the ultrasonic sensors and the weight sensor(s) are inputted and which processes the outputs to evaluate a seated-state based on the outputs. The evaluation circuit may be implemented in hardware as an electronic circuit or in software as a computer program.

In certain embodiments, a correlation function or state between the output of the various sensors and the desired result (i.e., seat occupancy identification and categorization) is determined, e.g., by a neural network that may be implemented in hardware as a neural computer or in software as a computer program. The correlation function or state that is determined by employing this neural network may also be contained in a microcomputer. In this case, the microcomputer can be employed as an evaluation circuit. The word circuit herein will be used to mean both an electronic circuit and the functional equivalent implemented on a microcomputer using software.

The seated-state detecting unit may further comprise a seat track position detecting sensor. This sensor determines the position of the seat on the seat track in the forward and aft direction. In this case, the evaluation circuit evaluates the seated-state, based on a correlation function obtain from outputs of the ultrasonic sensors, an output of the one or more weight sensors, and an output of the seat track position detecting sensor. With this structure, there is the advantage that the identification between the flat configuration of a detected surface in a state where a passenger is not sitting in the seat and the flat configuration of a detected surface which is detected when a seat is slid backwards by the amount of the thickness of a passenger, that is, of identification of whether a passenger seat is vacant or occupied by a passenger, can be reliably performed.

Furthermore, the seated-state detecting unit may also comprise a reclining angle detecting sensor, and the evaluation circuit may also evaluate the seated-state based on a correlation function obtained from outputs of the ultrasonic sensors, an output of the weight sensor(s), and an output of the reclining angle detecting sensor. In this case, if the tilted angle information of the back portion of the seat is added as evaluation information for the seated-state, identification can be clearly performed between the flat configuration of a surface detected when a passenger is in a slightly slouching state and the configuration of a surface detected when the back portion of a seat is slightly tilted forward and similar difficult-to-discriminate cases. This embodiment may even be combined with the output from a seat track position detecting sensor to further enhance the evaluation circuit.

Moreover, the seated-state detecting unit may further comprise a comparison circuit for comparing the output of the weight sensor(s) with a reference value. In this case, the evaluation circuit identifies an adult and a child based on the reference value.

Preferably, the seated-state detecting unit comprises: a plurality of ultrasonic sensors for transmitting ultrasonic waves toward a seat and receiving reflected waves from the seat; one or more weight sensors for detecting weight of a passenger in the seat; a seat track position detecting sensor; a reclining angle detecting sensor; and a neural network circuit to which outputs of the ultrasonic sensors and the weight sensor(s), an output of the seat track position detecting sensor, and an output of the reclining angle detecting sensor are inputted and which evaluates several kinds of seated-states, based on a correlation function obtained from the outputs.

The kinds of seated-states that can be evaluated and categorized by the neural network include the following categories, among others, (i) a normally seated passenger and a forward facing child seat, (ii) an abnormally seated passenger and a rear facing child seat, and (iii) a vacant seat.

The seated-state detecting unit may further comprise a comparison circuit for comparing the output of the weight sensor(s) with a reference value and a gate circuit to which the evaluation signal and a comparison signal from the comparison circuit are input. This gate circuit, which may be implemented in software or hardware, outputs signals which evaluates several kinds of seated-states. These kinds of seated-states can include a (i) normally seated passenger, (ii) a forward facing child seat, (iii) an abnormally seated passenger, (iv) a rear facing child seat, and (v) a vacant seat. With this arrangement, the identification between a normally seated passenger and a forward facing child seat, the identification between an abnormally seated passenger and a rear facing child seat, and the identification of a vacant seat can be more reliably performed.

The outputs of the plurality of ultrasonic sensors, the output of the weight sensor(s), the outputs of the seat track position detecting sensor, and the outputs of the reclining angle detecting sensor are inputted to the neural network or other pattern recognition circuit, and the neural network circuit determines the correlation function, based on training thereof during a training phase. The correlation function is then typically implemented in or incorporated into a microcomputer. For the purposes herein, neural network will be used to include both a single neural network, a plurality of neural networks, and other similar pattern recognition circuits or algorithms and combinations thereof.

To provide the input from the ultrasonic sensors to the neural network circuit, it is preferable that an initial reflected wave portion and a last reflected wave portion are removed from each of the reflected waves of the ultrasonic sensors and then the output data is processed. The neural network circuit determines the correlation function by performing a weighting process, based on output data from the plurality of ultrasonic sensors, output data from the weight sensor(s), output data from the seat track position detecting sensor if present, and/or on output data from the reclining angle detecting sensor if present.

With this arrangement, the portions of the reflected ultrasonic wave that do not contain useful information are removed from the analysis and the presence and recognition of an object on the passenger seat can be more accurately performed.

In the method for determining the occupancy of a seat in a passenger compartment of a vehicle in accordance with the invention, waves such as ultrasonic waves are transmitted into the passenger compartment toward the seat, reflected waves from the passenger compartment are received by a component which then generates an output representative thereof, the weight applied onto the seat is measured and an output is generated representative thereof and then the seated-state of the seat is evaluated based on the outputs from the sensors and the weight measuring means.

The evaluation the seated-state of the seat may be accomplished by generating a function correlating the outputs representative of the received reflected waves and the measured weight and the seated-state of the seat, and incorporating the correlation function into a microcomputer. In the alternative, it is possible to generate a function correlating the outputs representative of the received reflected waves and the measured weight and the seated-state of the seat in a neural network circuit, and execute the function using the outputs representative of the received reflected waves and the measured weight as input into the neural network circuit.

To enhance the seated-state determination, the position of a seat track of the seat is measured and an output representative thereof is generated, and then the seated-state of the seat is evaluated based on the outputs representative of the received reflected waves, the measured weight and the measured seat track position. In addition to or instead of measuring the seat track position, it is possible to measure the reclining angle of the seat, i.e., the angle between the seat portion and the back portion of the seat, and generate an output representative thereof, and then evaluate the seated-state of the seat based on the outputs representative of the received reflected waves, the measured weight and the measured reclining angle of the seat (and seat track position, if measured).

Furthermore, the output representative of the measured weight may be compared with a reference value, and the occupying object of the seat identified, e.g., as an adult or a child, based on the comparison of the measured weight with the reference value.

BRIEF DESCRIPTION OF THE DRAWINGS

The present invention will be described in further detail with reference to the accompanying drawings wherein.

DETAILED DESCRIPTION OF THE PREFERRED EMBODIMENTS

Figure 1:
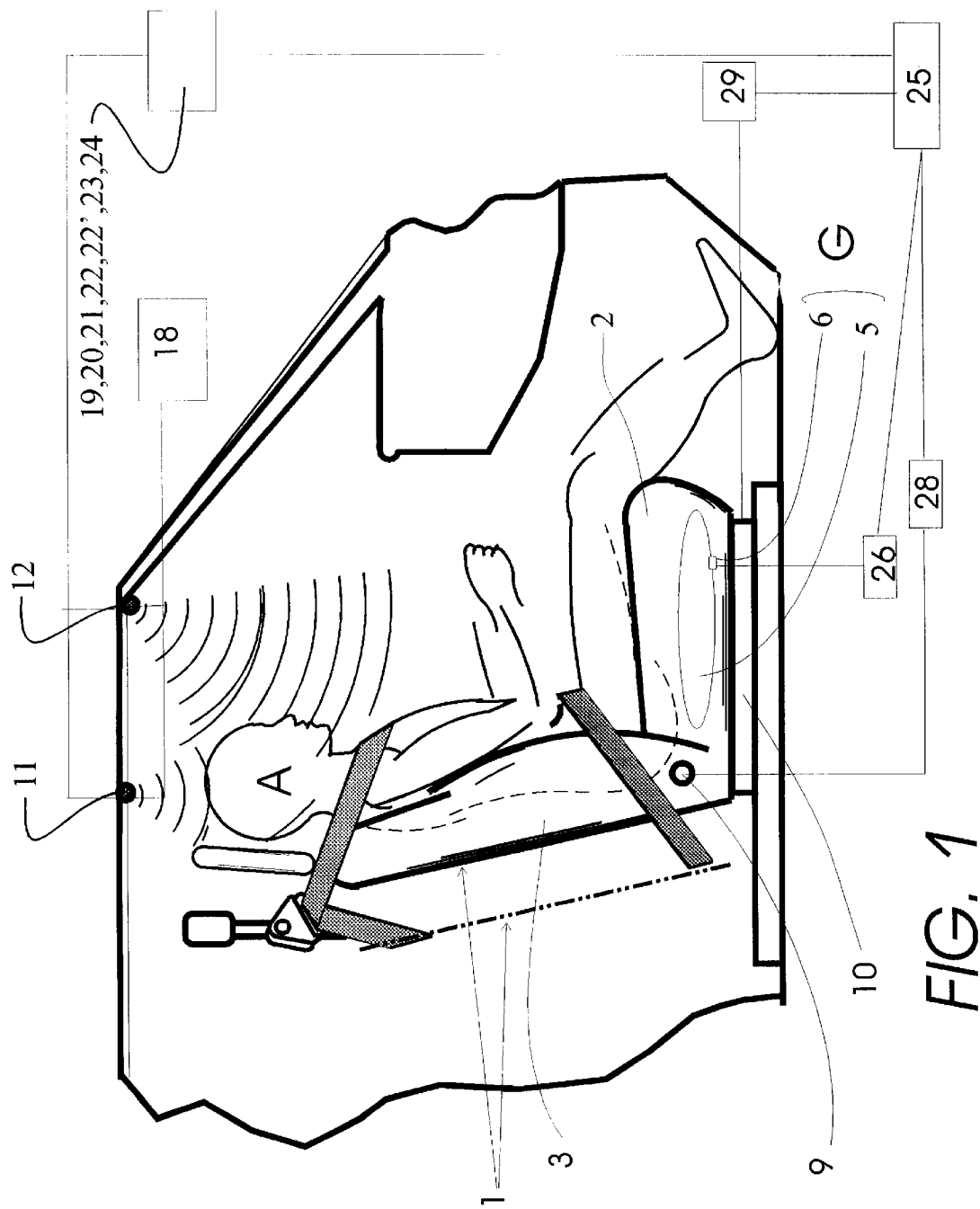
FIG. 1 shows a seated-state detecting unit in accordance with the present invention and the connections between ultrasonic sensors, a weight sensor, a reclining angle detecting sensor, a seat track position detecting sensor, a neural network circuit, and an airbag system installed within a vehicle compartment.

Referring to the accompanying drawings wherein like reference numbers designate the same or similar elements, FIG. 1 shows a passenger seat 1 to which a seated-state detecting unit according to the present invention may be applied. The passenger seat 1 includes a horizontally situated seat portion 2 and a vertically oriented back portion 3. The seat portion 2 is provided with one or more weight sensors 6 which determine the weight of a passenger or object occupying the passenger seat. The coupled portion between the seated portion 2 and the back portion 3 is provided with a reclining angle detecting sensor 9, which detects the tilted angle of the back portion 3 relative to the seat portion 2. The seat portion 2 is provided with a seat track position detecting sensor 10. The seat track position detecting sensor 10 fulfills a role of detecting the quantity of movement of the seat 1 which is moved from a back reference position, indicated by the dotted chain line.

Weight measuring means such as the sensor 6 are associated with the seat, e.g., mounted into or below the seat portion 2, for measuring the weight applied onto the seat. The weight may be zero is no occupant is present. Sensor 6 may represent a plurality of different sensors which measure the weight applied onto the seat at different portions thereof or for redundancy purposes, e.g., such as by means of an airbag 5 in the seat portion 2. Such sensors may be in the form of force or pressure sensors which measure the force or pressure on the seat or seat back, displacement measuring sensors which measure the displacement of the seat surface or the entire seat such as through the use of strain gages mounted on the seat structural members or other appropriate locations, or systems which convert displacement into a pressure wherein a pressure sensor can be used as a measure of weight.

Figure 2:
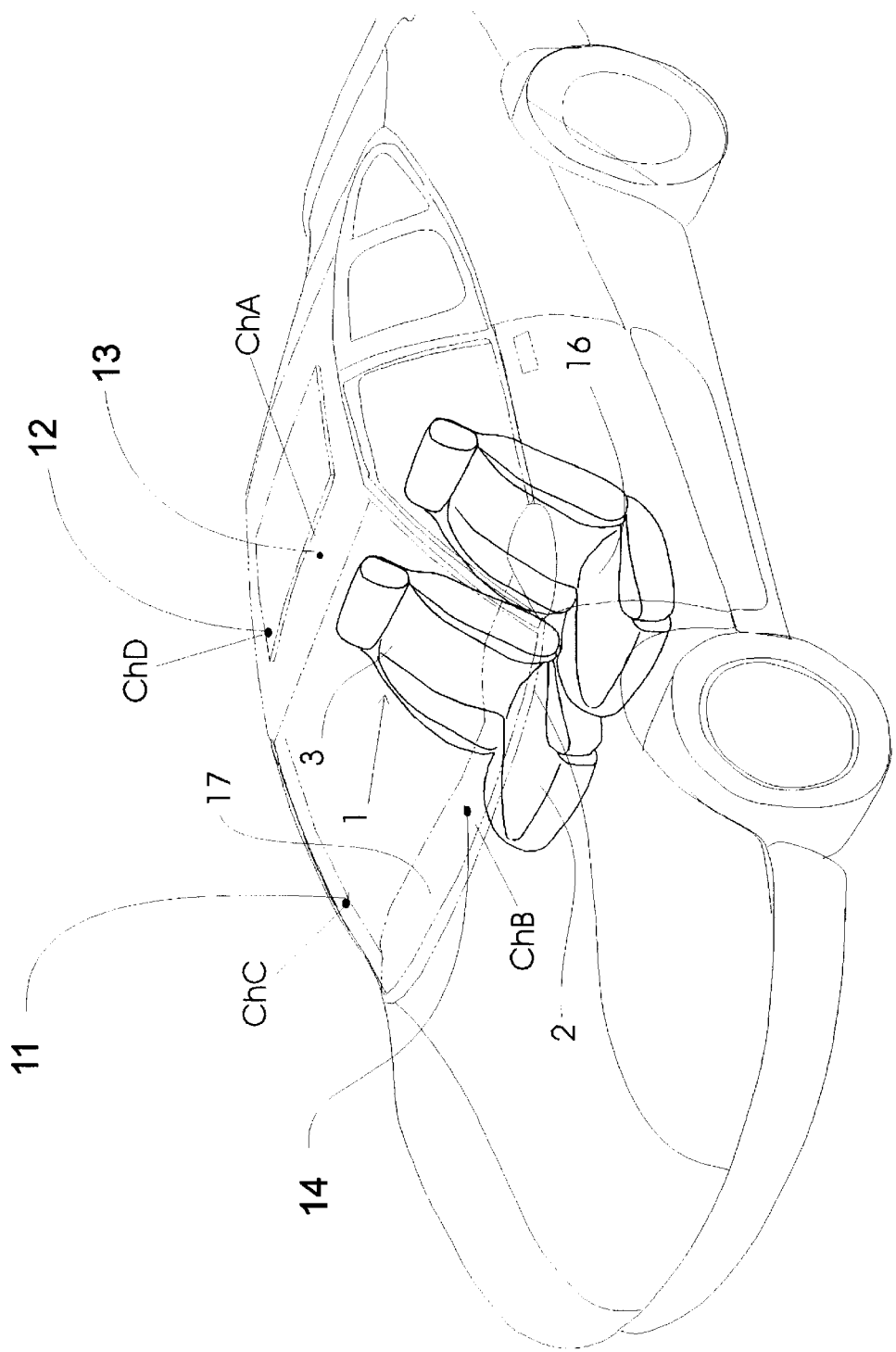
FIG. 2 is a view of a passenger seat in the compartment showing the relative layout of the ultrasonic sensors.

As shown in FIG. 2, there are provided four sets of ultrasonic sensors 11–14 mounted within the passenger compartment. Each set of ultrasonic sensors 11–14 comprises a transmitter and a receiver, which may be integrated into a single unit or individual components separated from one another. In this embodiment, the ultrasonic sensor 11 is mounted on the upper portion of the front pillar, A-Pillar, of the vehicle. The ultrasonic sensor 12 is mounted on the upper portion of the intermediate pillar, B-Pillar. The ultrasonic sensor 13 is mounted on the roof ceiling portion or the headliner (FIG. 2). The ultrasonic sensor 14 is mounted near the middle of an instrument panel 17 in front of the driver's seat 16 (FIG. 2). Although sensors 11–14 are described as being ultrasonic sensors, the invention is equally applicable for other types of sensors which emit waves (other than ultrasonic waves) which will reflect from an object and can be received by appropriate receivers and the received waves processed as described below.

Figure 3:
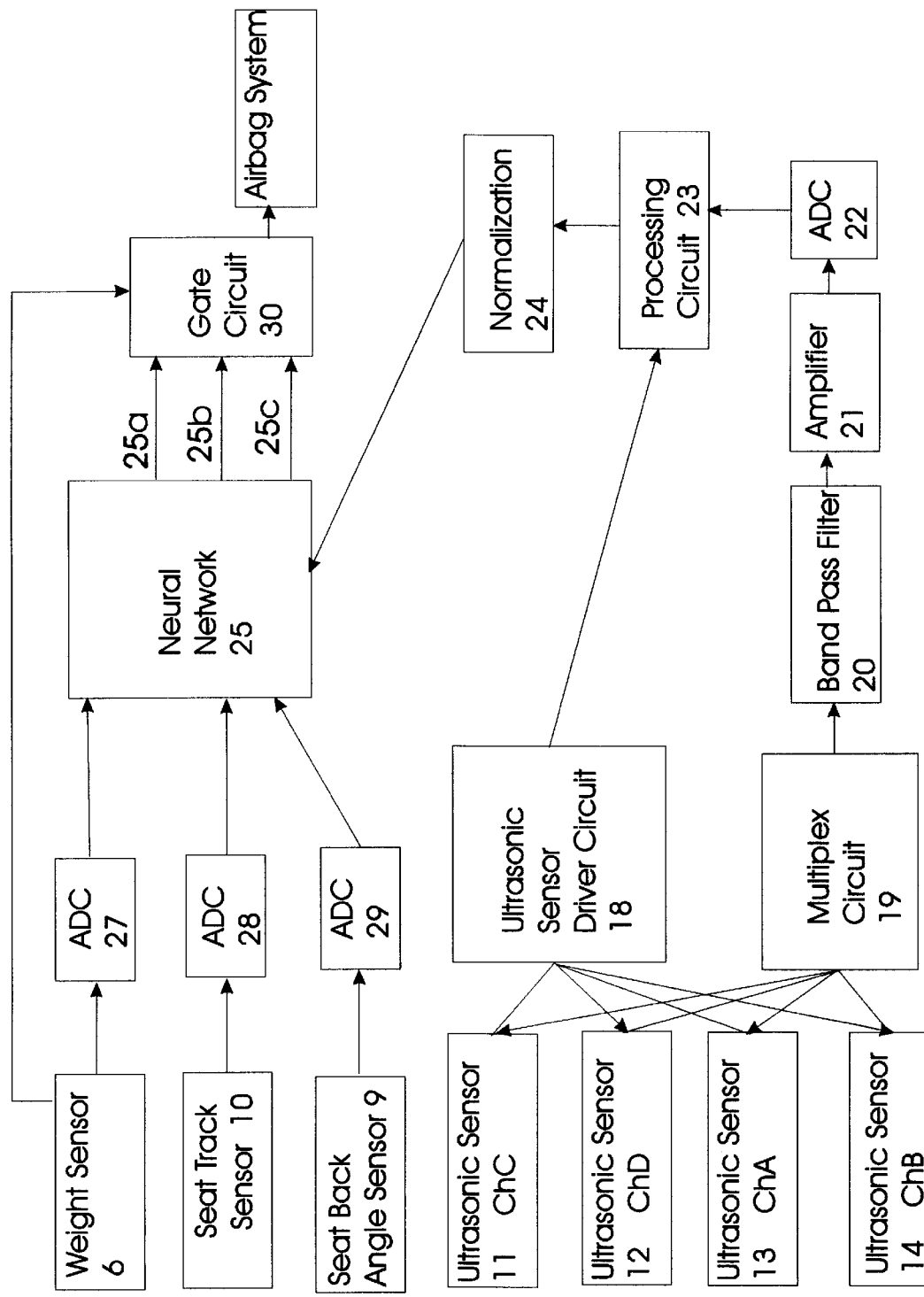
FIG. 3 is a circuit diagram of the seated-state detecting unit of the present invention.

The ultrasonic sensors 11–14 are controlled or driven, one at a time or simultaneously, by an appropriate driver circuit such as ultrasonic sensor driver circuit 18 shown in FIG. 3. The transmitters of the ultrasonic sensors 11–14 transmit respective ultrasonic waves toward the passenger seat 1 and transmit pulses (see FIG. 4(c)) in sequence at times t1, t2, t3 and t4 (t4>t3>t2>t1). The reflected waves of the ultrasonic waves are received by the receivers ChA-ChD of the ultrasonic sensors 11–14. The receiver ChA is associated with the ultrasonic sensor 13, the receiver ChEB is associated with the ultrasonic sensor 14, the receiver ChD is associated with the ultrasonic sensor 11, and the receiver ChD is associated with the ultrasonic sensor 12.

Figures 4A, 4B, 4C:
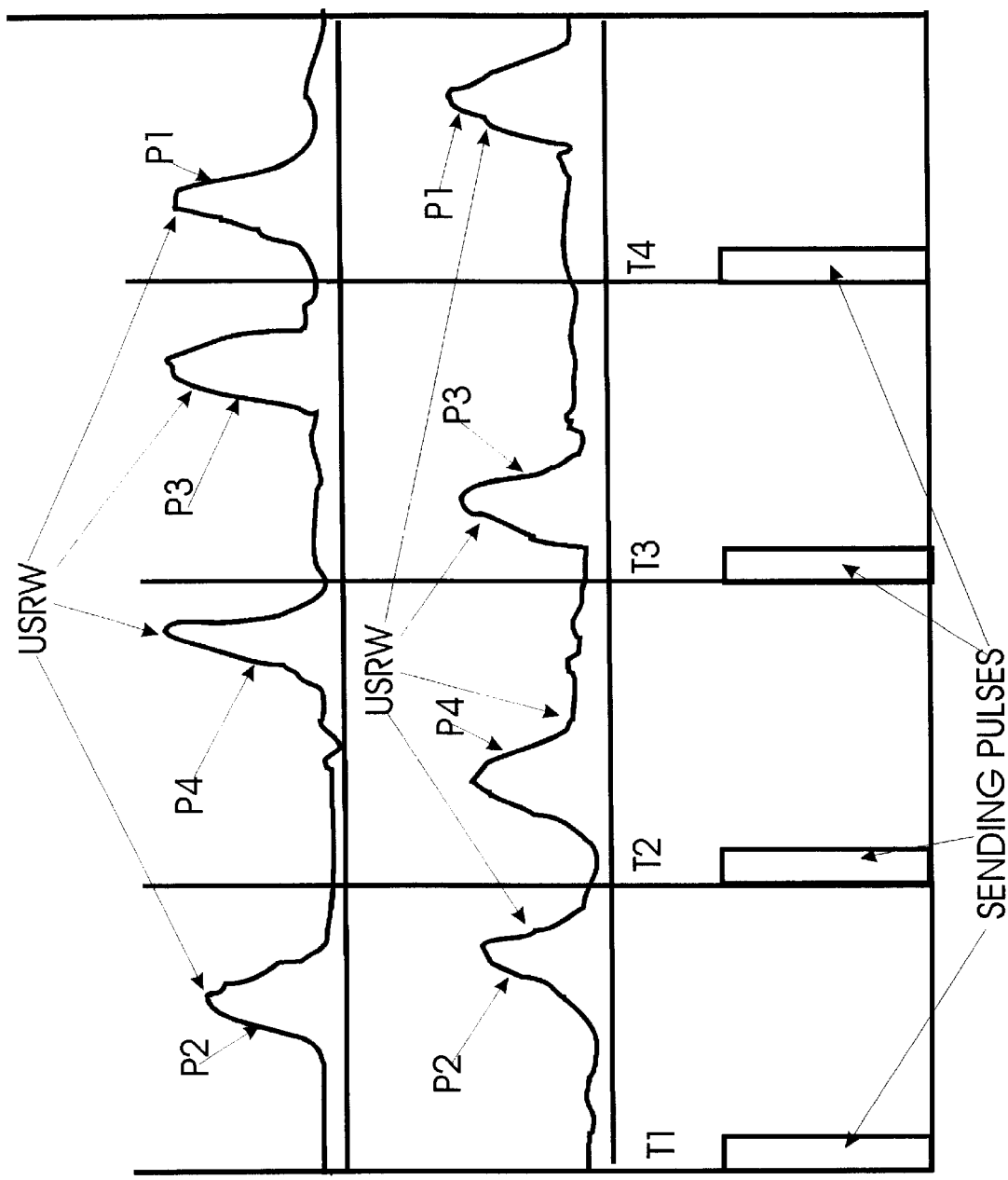
FIGS. 4(a), 4(b) and 4(c) are each a diagram showing the configuration of the reflected wave of an ultrasonic wave transmitted from each transmitter of the ultrasonic sensors toward the passenger seat, obtained within the time that the reflected wave arrives at a receiver, FIG. 4(a) showing an example of the reflected waves obtained when a passenger is in a normal seated-state, FIG. 4(b) showing an example of the reflected waves obtained when a passenger is in an abnormal seated-state (where the passenger is seated too close to the instrument panel), and FIG. 4(c) showing a transmit pulse.

FIGS. 4(a) and 4(b) show examples of the reflected ultrasonic waves USRW that are received by receivers ChA-ChD. FIG. 4(a) shows an example of the reflected wave USRW that is obtained when an adult passenger sits in a normally seated space on the passenger seat 1, while FIG. 4(b) shows an example of the reflected wave USRW that are obtained when an adult passenger sits in a slouching state (one of the abnormal seated-states) in the passenger seat 1.

In the case of a normally seated passenger, as shown in FIG. 2, the location of the ultrasonic sensor 12 is closest to the passenger A. Therefore, the reflected wave pulse P1 is received earliest after transmission by the receiver ChD as shown in FIG. 4(a), and the width of the reflected wave pulse P1 is larger. Next, the distance from the ultrasonic sensor 13 is closer to the passenger A, so a reflected wave pulse P2 is received earlier by the receiver ChA compared with the remaining reflected wave pulses P3 and P4. Since the reflected wave pauses P3 and P4 take more time than the reflected wave pulses P1 and P2 to arrive at the receivers ChC and ChB, the reflected wave pulses P3 and P4 are received as the timings shown in FIG. 4(a). More specifically, since it is believed that the distance from the ultrasonic sensor 11 to the passenger A is slightly shorter than the distance from the ultrasonic sensor 14 to the passenger A, the reflected wave pulse P3 is received slightly earlier by the receiver ChC than the reflected wave pulse P4 is received by the receiver ChB.

In the case where the passenger A is sitting in a slouching state in the passenger seat 1, the distance between the ultrasonic sensor 11 and the passenger A is shortest.

Therefore, the time from transmission at time t3 to reception is shortest, and the reflected wave pulse P3 is received by the receiver ChC, as shown in FIG. 4(b). Next, the distances between the ultrasonic sensor 14 and the passenger A becomes shorter, so the reflected wave pulse P4 is received earlier by the receiver ChB than the remaining reflected wave pulses P2 and P1. When the distance from the ultrasonic sensor 13 to the passenger A is compared with that from the ultrasonic sensor 12 to the passenger A, the distance from the ultrasonic sensor 13 to the passenger A becomes shorter, so the reflected wave pulse P2 is received by the receiver ChA first and the reflected wave pulse P1 is thus received last by the receiver ChD.

The configurations of the reflected wave pulses P1–P4, the times that the reflected wave pulses P1–P4 are received, the sizes of the reflected wave pulses P1–P4 are varied depending upon the configuration and position of an object such as a passenger situated on the front passenger seat 1. FIGS. 4(a) and (b) merely show examples for the purpose of description and therefore it is a matter of course that the present invention is not limited to these examples.

The outputs of the receivers ChA-ChD, as shown in FIG. 3, are input to a band pass filter 20 through a multiplex circuit 19 which is switched in synchronization with a timing signal from the ultrasonic sensor drive circuit 18. The band pass filter 20 removes a low frequency wave component from the output signal based on each of the reflected wave USRW and also removes some of the noise. The output signal based on each of the reflected wave USRW is passed through the band pass filter 20, then is amplified by an amplifier 21. The amplifier also removes the high frequency carrier wave component in each of the reflected USRW and generates an envelope wave signal. This envelope wave signal is input to an analog/digital converter (ADC) 22 and digitized as measured data. The measured data is input to a processing circuit 28, which is controlled by the timing signal which is in turn output from the ultrasonic sensor drive circuit 18.

The processing circuit 23 collects measured data at intervals of 7 ms, and 47 data points are generated for each of the ultrasonic sensors 11–14. For each of these reflected waves USRW, the initial reflected wave portion T1 and the last reflected wave portion T2 are cut off. The reason for this will be described when the training procedure of a neural network circuit is described later, and the description is omitted for now. With this, 32 data points, 31 data points, 37 data points, and 38 data points will be sampled by the ultrasonic sensors 11, 12, 13 and 14, respectively. The reason why the number of data points differs for each of the ultrasonic sensors 11–14 is that the distance from the passenger seat 1 to the ultrasonic sensors 11–14 differ from one another.

Each of the measured data is input to a normalization circuit 24 and normalized. The normalized measured data is input to the neural network circuit 25 as wave data.

The output of the weight sensor(s) 6 is amplified by an amplifier 26 coupled to the weight sensor(s) 6 and the amplified output is input to the analog/digital converter 27.

The reclining angle detecting sensor 9 and the seat track position detecting sensor 10, which each may comprise a variable resistor, are connected to constant-current circuits, respectively. A constant-current is supplied from the constant-current circuit to the reclining angle detecting sensor 9, and the reclining angle detecting sensor 9 converts a change in the resistance value on the tilt of the back portion 3 to a specific voltage. This output voltage is input to an analog/digital converter 28 as angle data, i.e., representative of the angle between the back portion 3 and the seat portion 2. Similarly, a constant current is supplied from the constant-current circuit to the seat track position detecting sensor 10 and the seat track position detecting sensor 10 converts a change in the resistance value based on the track position of the seat portion 2 to a specific voltage. This output voltage is input to an analog/digital converter 29 as seat track data. Thus, the outputs of the reclining angle detecting sensor 9 and the seat track position detecting sensor 10 are input to the analog/digital converters 28 and 29, respectively. Each digital data value from the ADCs 28,29 is input to the neural network circuit 25. Although the digitized data of the weight sensor(s) 6 is input to the neural network circuit 25, the output of the amplifier 26 is also input to a comparison circuit. The comparison circuit, which is incorporated in the gate circuit algorithm, determines whether or not the weight of an object on the passenger seat 1 is more than a predetermined weight, such as 60 lbs., for example. When the weight is more than 60 lbs., the comparison circuit outputs a logic 1 to the gate circuit to be described later. When the weight of the object is less than 60 lbs., a logic 0 is output to the gate circuit.

The neural network circuit 25 recognizes the seated-state of a passenger A by training as described in several books on Neural Networks referenced in the above referenced patents and patent applications. Then, after training the seated-state of the passenger A and developing the neural network weights, the system is tested. The training procedure and the test procedure of the neural network circuit 25 will hereafter be described with a flowchart shown in FIG. 6.

Figure 6:
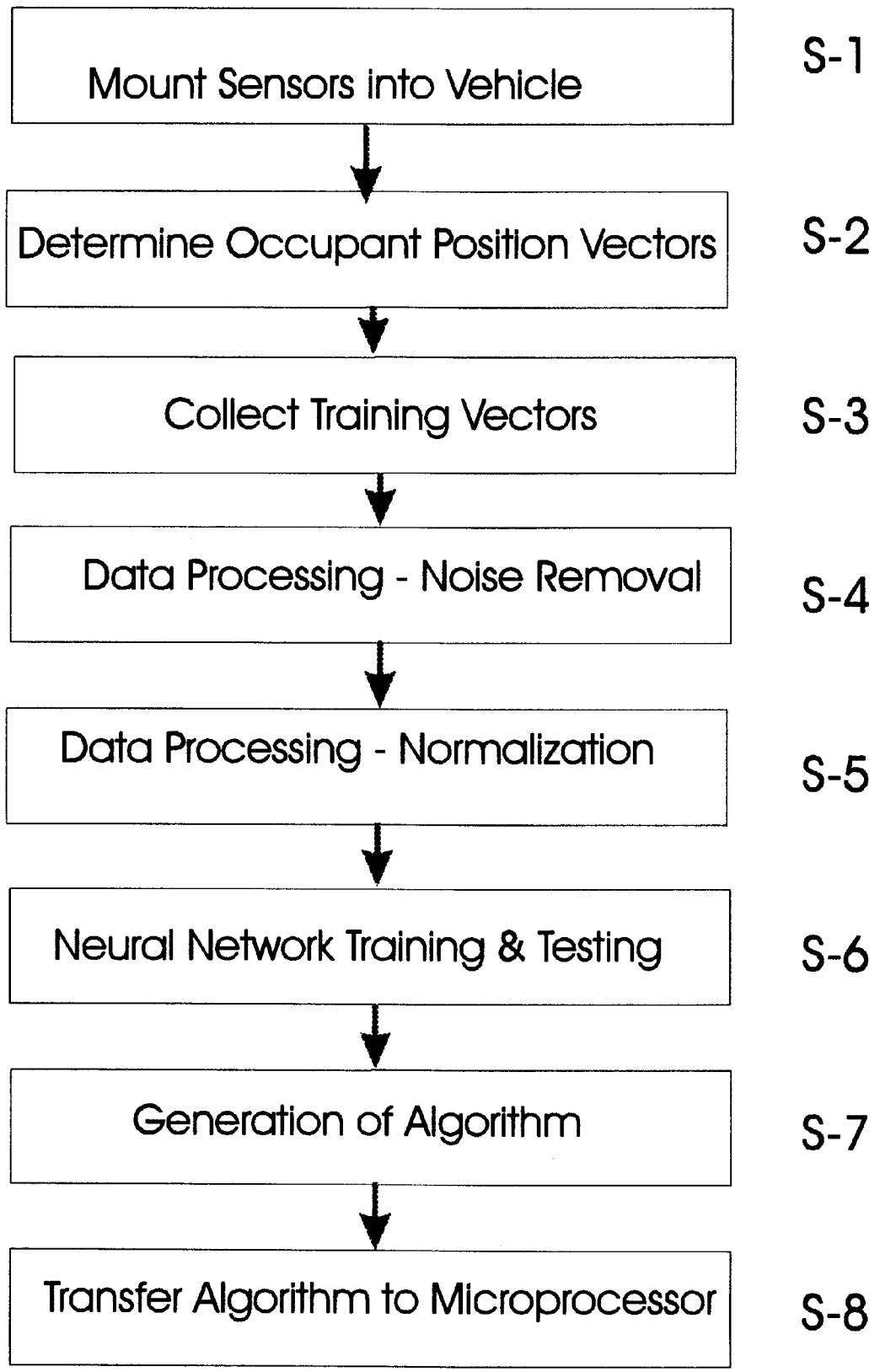
FIG. 6 is a flowchart showing the training steps of a neural network circuit.

As diagrammed in FIG. 6, the first step is to mount the four sets of ultrasonic sensors 11–14, the weight sensor 6, the reclining angle detecting sensor 9, and the seat track position detecting sensor 10 into a vehicle (step S1). Next, in order to provide data for the neural network circuit 25 to learn the patterns of seated states, data is recorded for patterns of all possible seated states and a list is maintained recording the seated states for which data was acquired. The data from the sensors/transducers 9–14, for a particular occupancy of the passenger seat is called a vector (step S2).

For the vectors of data, adults and children each with different postures, states of windows etc. within the passenger compartment, and child seats were selected. The selected adults include people with a variety of different physiques such as fat, lean, small, large, tall, short, and glasses wearing persons. The selected children ranged from an infant to a large child (for example, about 14 year old). In addition, the selected postures include, for example, a sitting state with legs crossed on a seat, a sitting state with legs on an instrument panel, a sitting state while reading a newspaper, a book, or a map, a sitting state while holding a cup of coffee, a cellular telephone or a dictation machine, and a slouching state. Furthermore, the selected compartment states include variations in the seat track position, the window opening amount, headrest position, and varying positions of a sunvisor. Moreover, a multitude of different models of child seats are used in the forward facing position and, where appropriate, in a rear facing position. The range of weights and the corresponding normalized values are as follows:

| Class | Weight Range | Normalized Value |
|---|---|---|
| Empty seat | 0 to 2.2 lbs | 0 to 0.01 |
| Rear Facing Child Seat | 2.2 to 60 lbs | 0.01 to 0.27 |

-continued

| Class | Weight Range | Normalized Value |
| --- | --- | --- |
| Forward facing Child Seat | 2.2 to 60 lbs | 0.01 to 0.27 |
| Normal Position Adult | 60 lbs and greater | .27 to 1 |

Obviously, other weight ranges may also be used in accordance with the invention and each weight range may be tailored to specific conditions, such as different vehicles.

Various vehicle setups were prepared by a combination of these variations and, for in this embodiment, almost 100,000 or more vectors should be prepared for the patterns to be used as data for the neural network training.

Figure 5:
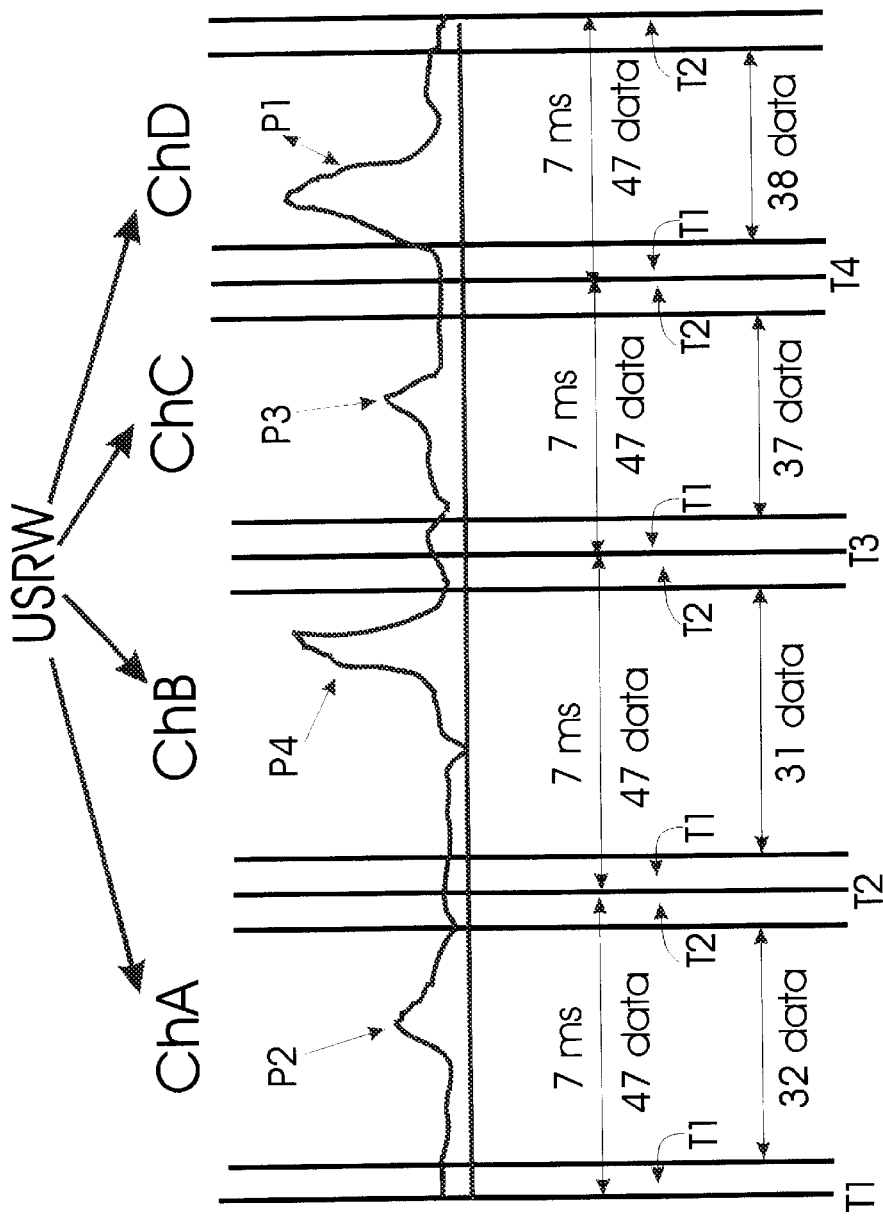
FIG. 5 is a diagram of the data processing of the reflected wave of the ultrasonic wave.

Next, based on the training data from the reflected waves of the ultrasonic sensors 11–14 and the other sensors, the vector data is collected (step S3). Next, the reflected waves P1–P4 are modified by removing the initial reflected waves with a short reflection time from an object (period T1 in FIG. 5) and the last portion of the reflected waves with a long reflection time from an object (period P2 in FIG. 5) (step S4). It is believed that the reflected waves with a short reflection time from an object is a due to cross-talk, that is, waves from the transmitters which leaks into each of their associated receivers ChA-ChD. It is also believed that the reflected waves with a long reflection time are reflected waves from an object far away from the passenger seat. If these two reflected wave portions are used as data, they will add noise to the training process. Therefore, these reflected wave portions are eliminated from the data.

Figures 7A, 7B:
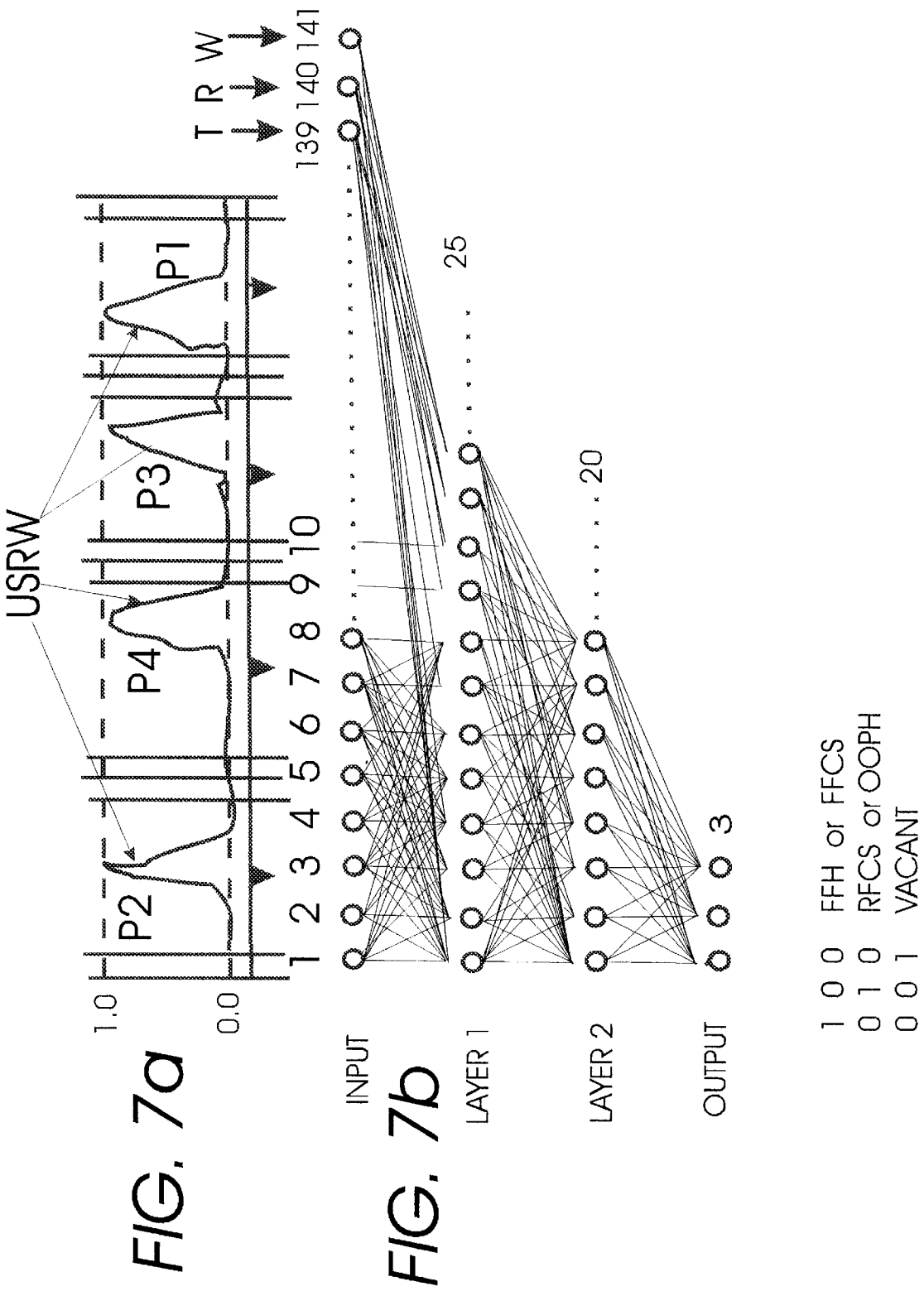
FIG. 7(a) is an explanatory diagram of a process for normalizing the reflected wave and shows normalized reflected waves.
FIG. 7(b) is a diagram similar to FIG. 7(a) showing a step of extracting data based on the normalized reflected waves and a step of weighting the extracted data by employing the data of the seat track position detecting sensor, the data of the reclining angle detecting sensor, and the data of the weight sensor.

As shown in FIG. 7(a), measured data is normalized by making the peaks of the reflected wave pulses P1–P4 equal (step S5). This eliminates the effects of different reflectivities of different objects and people depending on the characteristics of their surfaces such as their clothing Data from the weight sensor, seat track position sensor and eat reclining angle sensor are also normalized based typically on fixed normalization parameters.

Therefore, the normalized data from the ultrasonic transducers the seat track position detecting sensor 10, the reclining angle detecting sensor 9, and from the weight sensor(s) 6 are input to the neural network circuit 25, and the neural network circuit 25 is hen trained on this data. More specifically, the neural network circuit 25 adds up the normalized data from the ultrasonic transducers, from the seat track position detecting sensor 10, from the reclining angle detecting sensor 9, and from the weight sensor(s) 6, with each data point multiplied by a associated weight according to the conventional neural network process to determine correlation function (step S 6).

In this embodiment, 141 data points are appropriately interconnected at 25 connecting points of layer 1, and each data point is mutually correlated through the neural network training and weight determination process. The 141 data points consist of 138 measured data points from the ultrasonic transducers, the data (139th) from the seat track position detecting sensor 10, the data (140th) from the reclining angle detecting sensor 9, and the data (141st) from the weight sensor(s) 6. Each of the connecting points of the layer 1 has an appropriate threshold value, and if the sum of measured data exceeds the threshold value, each of the connecting points will output a signal to the connecting points of layer 2.

The connecting points of the layer 2 comprises 20 points, and the 25 connecting points of the layer 1 are appropriately interconnected as the connecting points of the layer 2. Similarly, each data is mutually correlated through the training process and weight determination as described above and in the above referenced neural network texts. Each of the 20 connecting points of the layer 2 has an appropriate threshold value, and if the sum of measured data exceeds the threshold value, each of the connecting points will output a signal to the connecting points of layer 3.

The connecting points of the layer 3 comprises 3 points, and the connecting points of the layer 2 are interconnected at the connecting points of the layer 3 so that each data is mutually correlated as described above. If the sum of the outputs of the connecting points of layer 2 exceeds a threshold value, the connecting points of the latter 3 will output Logic values (100), (010), and (001) respectively.

The threshold value of each connecting point is determined by multiplying weight coefficients and summing up the results in sequence, and the aforementioned training process is to determine a weight coefficient Wj so that the threshold value (ai) is a previously determined output.

$$ai = \Sigma Wj \cdot Xj (j=1 \text{ to } N)$$

wherein

Wj is the weight coefficient,

Xj is the data and

N is the number of samples.

Based on this result of the training, the neural network circuit 25 generates the weights for the coefficients of the correlation function or the algorithm (step S 7).

At the time the neural network circuit 25 has learned a suitable number of patterns of the training data, the result of the training is tested by the test data. In the case where the rate of correct answers of the seated-state detecting unit based on this test data is unsatisfactory, the neural network circuit is further trained and the test is repeated. In this embodiment, the test was performed based on about 20,000 test patterns. When the rate of correct test result answers was at about 98%, the training was ended.

The neural network circuit 25 has outputs 25a, 25b and 25c. Each of the outputs 25a, 25b and 25c outputs a signal of logic 0 or 1 to a gate circuit or algorithm 30. Based on the signals from the outputs 25a, 25b and 25c, any one of these combination (100), (010) and (001) is obtained. In another preferred embodiment, all data for the empty seat was removed from the training set and the empty seat case was determined based on the output of the weight sensor alone. This simplifies the neural network and improves its accuracy.

In this embodiment, the output (001) correspond to a vacant seat (VACANT), the output (010) corresponds to a rear facing child seat (RECS) or an abnormally seated passenger (ASP), and the output (100) corresponds to a normally seated passenger (NSP) or a forward facing child seat (FFCS).

The gate circuit (seated-state evaluation circuit) 30 can be implemented by an electronic circuit or by a computer algorithm by those skilled in the art and the details will not be presented here. The function of the gate circuit 30 is to remove the ambiguity that sometimes results when ultrasonic sensors and seat position sensors alone are used. This ambiguity is that it is sometimes difficult to differentiate between a rear facing child seat (RFCS) and an abnormally seated passenger (ASP), or between a normally seated passenger (NSP) or a forward facing child seat (FFCS). By the addition of one or more weight sensors in the function of acting as a switch when the weight is above or below 60 lbs, it has been found that this ambiguity can be eliminated. The gate circuit therefore takes into account the output of the neural network and also the weight from the weight sensor(s) as being above or below 60 lbs and thereby separates the two cases just described and results in five discrete outputs.

Thus, the gate circuit 30 fulfills a role of outputting five kinds of seated-state evaluation signals, based on a combination of three kinds of evaluation signals from the neural network 25 and superimposed information from the weight sensor(s). The five seated-state evaluation signals are input to an airbag deployment determining circuit that is part of the airbag system and will not be described here. Naturally, as disclosed in the above reference patents and patent applications, the output of this system can also be used to activate a variety of lights or alarms to indicate to the operator of the vehicle the seated state of the passenger. Naturally, the system that has been here described for the passenger side is also applicable for the most part for the driver side.

In this embodiment, although the neural network circuit 25 has been employed as an evaluation circuit, the mapping data of the coefficients of a correlation function may also be implemented or transferred to a microcomputer to constitute the valuation circuit (see Step S 8 in FIG. 6).

According to the seated-state detecting unit of the present invention, the identification of a vacant seat (VACANT), a rear facing child seat( RFCS), a forward facing child seat (FFCS), a normally seated adult passenger (NSP), an abnormally seated adult passenger (ASP), can be reliably performed.

While the present invention has been described with reference to a preferred embodiment thereof, the invention is not to be limited to the details given herein, but may be modified within the scope of the appended claims.

What is claimed is:

1. A seated-state detecting unit for determining the occupancy of a seat in a passenger compartment of a vehicle, comprising:
   a plurality of wave sensors, each of said wave sensors receiving waves from the passenger compartment and generating an output representative of the received waves;
   weight measuring means associated with the seat for measuring the weight applied onto the seat and generating an output representative of the measured weight applied onto the seat; and
   processor means for receiving the outputs from said wave sensors and said weight measuring means and evaluating the seated-state of the seat based thereon to determine whether the seat is occupied by an object and if the seat is occupied by an object, to identify the object in the seat;
   said processor means comprising a function correlating the outputs from said wave sensors and said weight measuring means and the seated-state of the seat and being generated by a neural network, the function being executed using the outputs from said wave sensors and said weight measuring means as input to determine the seated-state of the seat.

2. The seated-state detecting unit of claim 1, wherein said processor means comprise a microcomputer into which the function correlating the outputs from said wave sensors and said weight measuring means and the seated-state of the seat is incorporated.

3. The seated-state detecting unit of claim 1, further comprising a seat track position detecting sensor for determining the position of a seat track of the seat and generating an output representative of the position of the seat track of the seat, said processor means receiving the outputs from said wave sensors and said weight measuring means and said seat track position sensor and evaluating the seated-state of the seat based thereon.

4. The seated-state detecting unit of claim 1, further comprising a reclining angle detecting sensor for determining the reclining angle of the seat back and generating an output representative of the reclined angle of the seat back, said processor means receiving the outputs from said wave sensors and said weight measuring means and said reclining angle detecting sensor and evaluating the seated-state of the seat based thereon.

5. The seated-state detecting unit of claim 1, further comprising
   comparison means for comparing the output of said weight measuring means with a reference value;
   said weight measuring, means comprising a sensor structured and arranged to identify an adult or a child based on the comparison of the measured weight with the reference value by said comparison means.

6. The seated-state detecting unit of claim 1, wherein said wave sensors are ultrasonic sensors structured and arranged to transmit and receive ultrasonic waves.

7. The seated-state detecting unit of claim 1, wherein each of said wave sensors comprises a transmitter for transmitting waves into the passenger compartment and a receiver for receiving the waves transmitted by said transmitter and reflected from the passenger compartment.

8. A seated-state detecting unit for determining the occupancy of a seat in a passenger compartment of a vehicle, comprising:
   a plurality of wave sensors, each of said wave sensors receiving waves from the passenger compartment and generating an output representative of the received waves;
   weight measuring means associated with the seat for measuring the weight applied onto the seat and generating an output representative of the measured weight applied onto the seat;
   a seated track position detecting sensor for determining the position of a seat track of the seat and generating an output representative of the position of the seat track of the seat;
   a reclining angle detecting sensor for determining the reclining angle of the seat and generating an output representative of the reclined angle of the seat; and
   a neural network for receiving the outputs of said wave sensors, said weight measuring means, said seat track position detecting sensor and said reclining angle detecting sensor and evaluating at least three seated-states based on said outputs to determine whether the seat is occupied by an object and if the seat is occupied by an object, to identify the object in the seat.

9. The seated-state detecting unit of claim 8, wherein said at least three seated-states include a first state of a normally seated passenger or a forward facing child seat, a second state of an abnormally seated passenger or a rear facing child seat, and a third state of a vacant seat, and wherein said neural network outputs evaluation signals which evaluate said first state, said second state, and said third state.

10. The seated-state detecting unit of claim 9, further comprising:
    comparison means for comparing the output of said weight measuring means with a reference value and generating a comparison signal; and a gate circuit to which said evaluation signals from said neural network and the comparison signal from said comparison means are input;

wherein said gate circuit outputs signals which evaluate five seated-states.

11. The seated-state detecting unit of claim 10, wherein said five seated-states are a normally seated passenger, a forward facing child seat, an abnormally seated passenger, a rear facing child seat and a vacant seat.

12. The seated-state detecting unit of claim 8, wherein said neural network generates a function correlating the outputs from said wave sensors, said weight measuring means, said seat track position detecting sensor and said reclining angle detecting sensor and the seated-state of the seat based on training.

13. The seated-state detecting unit of claim 12, wherein said correlation function is implemented in a microcomputer.

14. The seated-state detecting unit of claim 12, wherein an initial wave portion and a last wave portion are removed from each of the waves received by said wave sensors prior to generating the output therefrom representative of the waves.

15. The seated-state detecting unit of claim 12, wherein said neural network generates said correlation function by performing a weighting process based on the output from said wave sensors, said weight measuring means, said seat track position detecting sensor and said reclining angle detecting sensor.

16. The seated-state detecting unit of claim 8, wherein said wave sensors are ultrasonic sensors structured and arranged to transmit and receive ultrasonic waves.

17. The seated-state detecting unit of claim 8, wherein each of said wave sensors comprises a transmitter for transmitting waves into the passenger compartment and a receiver for receiving the waves transmitted by said transmitter and reflected from the passenger compartment.

18. A method for determining the occupancy of a seat in a passenger compartment of a vehicle, comprising the steps of:

receiving waves from the passenger compartment and generating an output representative of the received waves;

measuring the weight applied onto the seat and generating an output representative of the measured weight applied onto the seat; and evaluating the seated-state of the seat based on the outputs representative of the received waves and the measured weight to determine whether the seat is occupied by an object and if the seat is occupied by an object, to identify the object in the seat;

the step of evaluating the seated-state of the seat comprising the steps of;

generating a function correlating the outputs representative of the received waves and the measured weight and the seated-state of the seat in a neural network; and executing the function using the outputs representative of the received waves and the measured weight is input.

19. The method of claim 18, wherein the step of evaluating the seated-state of the seat further comprises the of:

incorporating the correlation function into a microcomputer.

20. The method of claim 18, further comprising the steps of:

determining the position of a seat track of the seat and generating an output representative of the position of the seat track of the seat; and evaluating the seated-state of the seat based on the outputs representative of the received waves and the measured weight and the determined position of the seat track.

21. The method of claim 18, further comprising the steps of:

determining the reclining angle of the seat and generating an output representative of the reclined angle of the seat; and evaluating the seated-state of the seat based on the outputs representative of the received waves and the measured weight and the determined reclining angle of the seat.

22. The method of claim 18, further comprising the steps of:

comparing the output representative of the measured weight with a reference value; and identifying an adult or a child based on the comparison of the measured weight with the reference value.

* * * * *